United States Patent [19]
Sangermano et al.

[11] 3,876,409
[45] Apr. 8, 1975

[54] LASER FUSION OF GLASS ELECTRODES

[75] Inventors: Lawrence David Sangermano; William Lester Mowrey, both of Burnt Hills, N.Y.

[73] Assignee: General Electric Company, Milwaukee, Wis.

[22] Filed: Nov. 15, 1972

[21] Appl. No.: 306,904

[52] U.S. Cl. ............... 65/40; 65/57; 65/271; 65/DIG. 6
[51] Int. Cl. .............................. C03b 23/20
[58] Field of Search ....... 65/36, 40, 57, 271, DIG. 6

[56] References Cited
UNITED STATES PATENTS
3,217,088  11/1965  Steierman ........................ 65/40 X
3,471,392  10/1969  Kansky ............................ 65/DIG. 6

*Primary Examiner*—Arthur D. Kellogg
*Attorney, Agent, or Firm*—Morgan, Finnegan, Durham & Pine

[57] ABSTRACT

A novel method of affixing a glass membrane to a glass electrode is described which employs a laser beam. The method is especially useful in the manufacture of glass pH electrodes and ion-selective electrodes in general.

6 Claims, 1 Drawing Figure

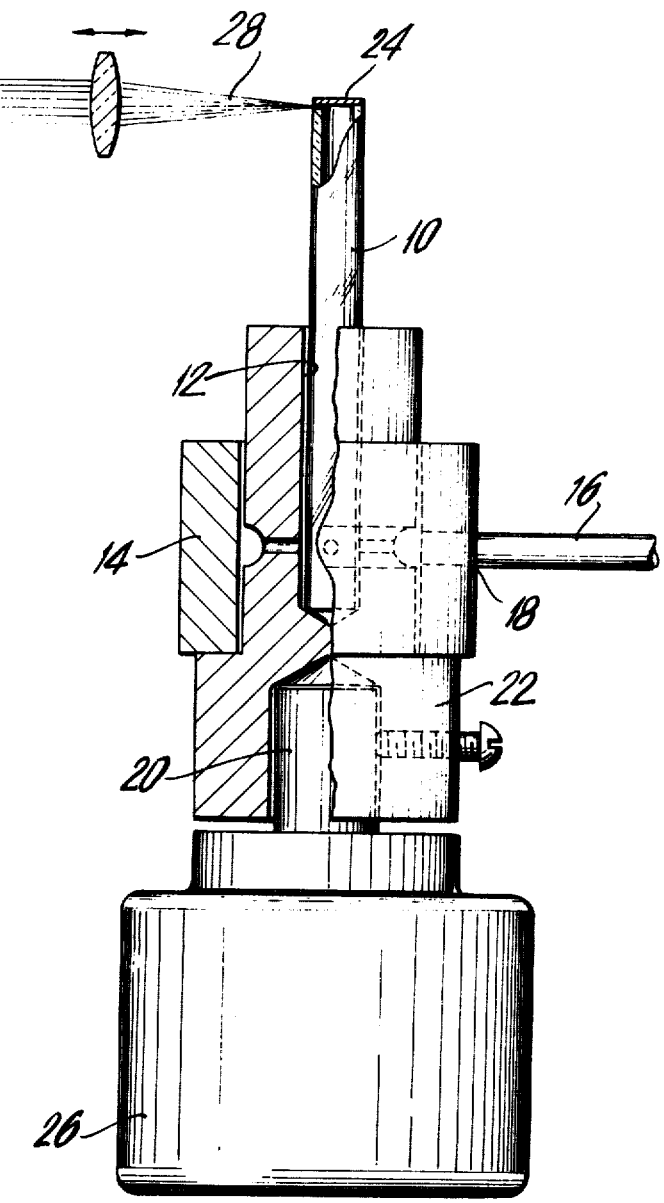

3,876,409

LASER FUSION OF GLASS ELECTRODES

BACKGROUND OF THE INVENTION

Glass electrodes are commonly employed to measure pH on the principle that an electric tension exists between one surface of the glass and an aqueous solution which varies as a function of the pH of the solution. The glass electrode comprises a glass membrane which is shaped in the form of a closed vessel containing a comparison electrode immersed in a solution of constant hydrogen ion concentration and containing an ion that is reversible with said comparison electrode. These vessels are assembled by skilled gas blowers by flame sealing a glass membrane to the end of a tube of glass wherein the comparison electrode and the electrolylte are contained. These membranes are either flat, slightly concave or slightly convex. Particular difficulty is encountered in assembling the flat type of glass electrodes because these tend to warp or otherwise become distorted under the influence of the glass blowers torch.

Accordingly, it is one object of this invention to provide an improved method of affixing the glass membrane of a glass electrode, the method providing a sealed membrane with an undistorted surface.

It is also an object of this invention to provide an inexpensive, reproducible technique for fabricating glass electrodes.

DESCRIPTION OF THE DRAWING

The drawing is a partial cross-section of an elevation of an electrode assembly in a preferred form of workholder that is used to relatively position the electrode in the path of the laser beam.

DESCRIPTION OF THE INVENTION

According to the present invention, there is provided a method of affixing a glass membrane to a glass electrode which comprises fusion sealing said glass membrane to the glass casing of the electrode sub-assembly using a focused beam of a laser to provide the means for fusion. In the practice of the invention, any particular laser may be employed so long as it has an effective wave length; and sufficient power and efficiency to fuse the interface between the glass membrane and the glass casing of the electrode.

It is preferred to employ a molecular gas laser for this purpose and especially preferred to employ a carbon dioxide laser for this purpose.

Among the glass membrane electrodes provided herein are those which are being employed, for example, to measure $H^+$, $Na^+$, $Li^+$, $Ag^+$, $K^+$, $Rb^+$, $Cs^+$, $NH_4^+$, $Tl^+$, $Mg^{++}$, $Ca^{++}$, $Sr^{++}$ and $Ba^{++}$. The criteria for the selection of suitable glass membranes for particular purposes is detailed in the literature and those skilled in the art may select appropriate glass compositions to achieve the desired cation selectivity.

In a preferred embodiment, fusion sealing of the glass membrane to the glass casing of the electrode is effected by mounting said membrane and said casing in a suitable workholder and especially preferably, a workholder adapter to rotate the sub-assembly through an arc of 360° (or a multiple thereof) in the path of a focused laser beam during at least the fusion step. It is preferred during the fusion step also to hold the membrane in contact with the casing by means of a vacuum which is applied to the glass casing through a rotatable workholder.

The rotatable workholder is provided with a motor-driven base which is capable of low speed (e.g., 10–200 rpm) operation so that the glass membrane glass tubing assembly will be rotated through the focused laser beam at a uniform rate of speed. This procedure insures uniform contact time and results in a continuous glass to glass seal without membrane distortion.

The glass membrane surface may be either flat or curved. In particular, the laser technique is highly advantageous as it results in a seal without distortion of the preformed membrane surface.

DESCRIPTION OF THE PREFERRED EMBODIMENT

A pH selective electrode was made from the following materials:

Membrane - Corning 015 glass
  $SiO_2$ 72 mol %
  $CaO$ 6 mol %
  $Na_2O$ 22 mol %
  $Sb_2O_3$ <1.0 mol %

Tubing - Corning 0120 glass
  $SiO_2$ 56–64 mol %
  $PbO$ 25–30 mol %
  $Al_2O_3$ 1 mol %
  $Na_2O$ 5–8 mol %
  $K_2O$ 6–8 mol %

With reference to the drawing, a 3/16 inch diamter glass tubing which forms glass casing 10 in the finished electrode was placed in receiving element 12 of vacuum chuck 22. Vacuum collar 14, of brass or any other suitable material is placed around vacuum chuck 22 and vacuum line 16 is connected thereto at port 18. Thereafter, vacuum chuck 22 and vacuum collar 14 are placed on rotatable motor driven mount 20. Glass membrane 24 is then positioned on the upper, open end of glass casing 10 and a partial vacuum is applied by aspirating or pumping through vacuum line 16 to hold the glass parts of the sub-assembly together. Thereafter, the assembly is positioned in the path of the laser beam and the laser beam 28 is adjusted so that it impinges on the joint area at an angle that is orthogonal to the glass casing. The rotatable motor driven mount 20 is rotated at 60 rpm by a Bodine type KYC-23RB motor in motor housing 26 while a power of 10 watts is applied at an effective wave length to fuse the glass. In this arrangement, the rotatable motor driven mount is the motor shaft. As the membrane and casing are fused together, the partial vacuum is gradually released so as to prevent rupture of the membrane 24 or casing 10.

In one embodiment, a $Na^+$ selective membrane, NAS 11–18 is fused to a GSC No. 3 (G.E. Co.) tubing by a procedure analogous to that employed hereinabove.

It is to be understood that other changes may be made in the particular embodiment of the invention in the light of the above-teachings, but that these will be within the full scope of the invention as defined by the appended claims.

What is claimed is:

1. A method of affixing a glass membrane to a glass electrode which comprises fusion sealing said glass membrane to the glass casing of said glass electrode by means of a focused beam of laser, applying a partial vacuum to hold said glass membrane in contact with said glass electrode, during fusion sealing, and gradually releasing said partial vacuum as the fusion sealing is effected so that rupture of the glass membrane is prevented.

2. A method as defined in claim 1 wherein the laser is a molecular gas laser.

3. A method as defined in claim 2 wherein the molecular gas laser is a carbon dioxide laser.

4. A method as defined in claim 1 wherein said glass membrane is selective for a cation selected from the group consisting of $H^+$, $Na^+$, $Li^+$, $Ag^+$, $K^+$, $Rb^+$, $Cs^+$, $NH_4^+$, $Tl^+$, $Mg^{++}$, $Ca^{++}$, $Sr^{++}$ and $Ba^{++}$.

5. A method as defined in claim 1 wherein said glass membrane is flat.

6. A method as defined in claim 1 wherein said fusion sealing is effected by rotating the glass membrane and glass casing through an arc of at least 360° in the path of said focused laser beam.

* * * * *